United States Patent [19]

Messick

[11] Patent Number: 5,464,647
[45] Date of Patent: Nov. 7, 1995

[54] QUICK COOKING BARLEY AND PROCESS FOR PREPARATION

[75] Inventor: Donald L. Messick, Rehoboth Beach, Del.

[73] Assignee: Kraft Foods, Inc., Northfield, Ill.

[21] Appl. No.: 136,421

[22] Filed: Oct. 13, 1993

[51] Int. Cl.$^6$ ............................................. A23L 1/172
[52] U.S. Cl. ............................................. 426/618; 426/461
[58] Field of Search ................................... 426/461, 618

[56] References Cited

U.S. PATENT DOCUMENTS

| | | | |
|---|---|---|---|
| 2,944,904 | 7/1960 | Seltzer | 426/461 |
| 3,342,607 | 9/1967 | Hickey | 426/461 |
| 4,881,180 | 12/1992 | Wu | 426/461 |
| 5,089,281 | 2/1992 | Baz et al. | 426/461 |
| 5,240,728 | 8/1993 | Grenet et al. | 426/461 |

Primary Examiner—Jeanette Hunter
Assistant Examiner—Mary S. Mims
Attorney, Agent, or Firm—Thomas R. Savoie; Thomas A. Marcoux

[57] ABSTRACT

A quick-cooking barley product can be cooked by hydrating in at least an equal volume of boiling water (typically 1:1.5 barley to water) for from 5 to 15 minutes followed by a 5 minute stand. It has a cooked texture, as measured by a shear press value of 70 top 95 lbs/force (preferably 75–90) and appearance similar to long cooking barley. The product can be prepared without any flattening or flaking of the barley. The process comprises: cooking pearled barley to raise the moisture content of the barley to 55 to 65%; subjecting the barley to an atmosphere of ambient-pressure, saturated steam while spraying hot water onto the barley in order to obtain a drained moisture of 70%–80%; draining; and drying to a moisture content of about 12% or less.

14 Claims, 1 Drawing Sheet

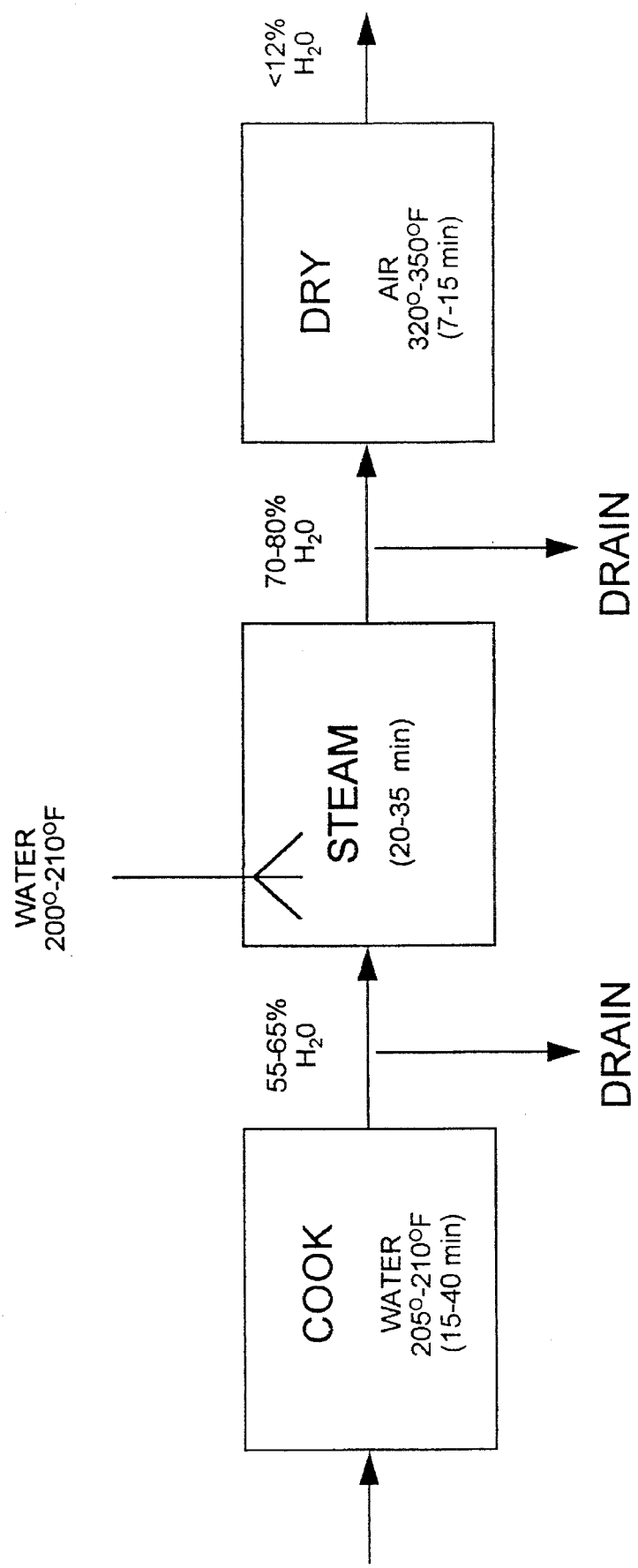

QUICK COOKING BARLEY AND PROCESS FOR PREPARATION

DESCRIPTION

TECHNICAL FIELD

The invention relates to the provision of a barley product which can be rapidly prepared by the consumer with a minimum of cooking.

Barley is a cereal grain (*hordeum vulgare*). It is the fourth largest cereal crop in the world and the oldest grain known to mankind. It is most often used as a feed for animals and in the production of malt beverages such as beer. As a source of human nutrition, it is potentially useful but infrequently used. Depending on the variety, it can be a good source of protein, complex carbohydrates, and soluble fiber.

The preparation of barley for eating is a time-consuming and energy-intensive operation. Traditionally, barley has been prepared by a long-cooking procedure. Ordinarily, long-cooking entails soaking in water overnight and cooking in boiling water for from about 40 to about 60 minutes. The result is separate, integral grains with good texture and resistance to bite. There is a need to provide a quick-cooking barley product which substantially retains the desired characteristics of the long-cooking procedure.

BACKGROUND ART

The art has developed several procedures for preparing barley in a manner which would increase the ease of final cooking by the end user. However, each of the prior art procedures has at least one shortcoming.

In U.S. Pat. No. 2,890,957 and No. 2,944,904, Seltzer describes processing barley or rice to render them quick-cooking. The grains are soaked in water to hydrate without gelatinizing, steamed under pressure to gelatinize, compressed and finally dried. The barley prepared in this manner is physically deformed, yet still requires cooking for ten minutes for final preparation.

In U.S. Pat. No. 3,495,989, Lewis et al. describe the preparation of barley and a wide variety of other foods as quick-cooking foods. Their process entails soaking the barley in saline solution, tempering, gelatinizing in hot air, packaging and pasteurizing. Even though the product has a higher moisture than the unprocessed grain—requiring vacuum packaging and pasteurizing—it requires simmering for 12 minutes prior to serving.

Takatsu et al., in U.S. Pat. No. 3,914,454, disclose the treatment of various cereal foods, including barley, to make their final preparation easier. The disclosure calls for gelatinizing with pressurized steam, drying, and frying. The frying produces swelled, porous granules which must be deoiled prior to packaging.

In U.S. Pat. No. 4,707,371, Yamaguchi et al. describe the preparation of a microwavable barley by utilizing pressure cooking as a first gelatinizing step, soaking for a second period of time, and drying over a period of 90 minutes.

Each of the prior art procedures has a shortcoming in terms of energy consumption, ease of final preparation, or loss of product texture or integrity. None of the prior art procedures has recognized that it is possible to process barley so that it can be prepared for eating by a simple five minute cook, followed by a five minute stand.

SUMMARY OF THE INVENTION

It is an object of the invention to provide a barley product which is convenient for home and institutional use.

It is an object of the invention to provide a barley product which can be rapidly prepared by the consumer.

It is an object of the invention to provide a barley product which has a good texture after a simple and short-time preparation.

It is yet another object of the invention to provide a process for preparing a convenient barley product without flattening, flaking, or otherwise deforming the barley, but yet enables rapid preparation by the consumer.

It is another, more specific object of a preferred embodiment of the invention to provide a process for producing a convenient barley product without flattening, flaking, or otherwise deforming the barley, but which yet enables rapid preparation to good eating consistency and texture.

These and other objects are achieved by the invention which provides a process for preparing a quick-cooking barley product and the product itself.

The barley product of the invention can be cooked by hydrating in at least an equal volume of boiling water (typically, 1:1.5 barley to water) for from about 5 to about 15 minutes followed by a 5 minute stand and which will have a cooked texture, as measured by a shear press value of from about 70 to about 95 lbs/force (preferably from about 75 to about 90) and appearance similar to long-cooking barley. The product can be prepared without any flattening, flaking, or otherwise deforming the barley.

The process of the invention comprises the steps of: (a) cooking hulled, medium- or fine-pearled barley in hot water (preferably, having a temperature of from about 205° to 210° F.) for from about 15 to about 40 minutes in order to raise the moisture content of the barley to from about 55 to about 65%; (b) separating the cooked barley from the hot water; (c) subjecting the barley to an atmosphere of ambient-pressure, saturated steam for from about 20 to about 35 minutes while spraying hot water onto the barley, at least during the initial period of steaming, in order to obtain a drained moisture of from about 70 to about 80% (preferably from about 73 to about 77%); (d) draining the steamed barley from free and surface water; and (e) drying the drained barley with hot air having a temperature of from about 320° to about 350° F. over a time period of from about 7 to about 15 minutes to obtain a moisture content of about 12% or less.

In the preferred embodiment, the cook water of step (c) is adjusted to a pH of from about 4.0 to about 5.0 in order to maintain a light color throughout preparation and drying of the quick-cooking barley. Preferably, the pH is adjusted with phosphoric acid. The barley is preferably cooked in a continuous, rotary cooker.

DESCRIPTION OF THE DRAWINGS

The invention will be better understood and its advantages will be more apparent when the following detailed description is read in light of the accompanying drawing, wherein:

The FIGURE is a block diagram of one embodiment of the invention wherein barley is cooked, steamed, and dried according to the invention to provide a product which can be prepared for consumption by simply boiling for five minutes and then letting stand for another five.

INDUSTRIAL APPLICABILITY AND BEST MODE

The following description centers on the preparation of a quick-cooking barley product by a process scheme as illustrated in the FIGURE. It will be understood that different equipment than that described and different barley starting materials may change the conditions described. The processing conditions are, however, surprisingly effective in producing a barley product without mechanically deforming the individual grains or the use of pressure equipment as has been required by the prior art to achieve a quick-cooking product.

The FIGURE illustrates a process for preparing a quick-cooking barley according to the invention. The product barley can be cooked by a simple boil-and-stand procedure to provide a cooked texture, as measured by a shear press value of from about 70 to about 95 lbs/force (preferably from about 75 to about 90) and appearance similar to long-cooking barley. The above shear press values, and those throughout this description, are determined in equipment and by the procedure described in U.S. Pat. No. 4,857,348 to Abraham et al., differing only in the manner of preparation of the grain for testing. The samples are prepared for the shear press by immersing in 1.5 volumes of boiling water, continuing the boiling for 5 minutes, and removing the heat and letting the product stand in the hot water for another 5 minutes.

The barley used as a starting material will preferably be pearled, preferably from medium to fine pearled. In the case of naked barley, then, the outermost about 16 to about 22% of the grains will have been removed. And, in the case of covered barley (the most prevalent) it will be hulled and the outermost about 37 to about 48% of the grains (including the hull) will have been removed. In addition, in the choice between barleys with two kernels in a row or those with six kernels in a row, it is the six-in-a-row variety which is preferred. And, in the choice between the waxy and non-waxy varieties, it is the non-waxy varieties which are preferred.

The first step in the process is cooking the preferably hulled and medium or fine pearled barley in water. The water temperature should be sufficiently high to rapidly raise the moisture content of the barley without boiling off at an excessive rate or requiring the use of pressure equipment. Typically, the cooking can be accomplished in a suitable vessel, such as a stainless steel rotary cooker of the type employed to process quick-cooking rice. The cooker will hold water at a temperature of from about 205° to about 210° F. The cooking time at this temperature will be for a period of from about 15 to about 40 minutes. The combination of time and temperature is selected to raise the moisture content of the barley to from about 55 to about 65% by weight of the hydrated product. Here, and throughout this description, all parts and percentages are by weight and are based on the weight of the material being processed at the indicated stage in processing.

To maintain the natural color of the barley during processing, including during the cooking and drying stages, the pH of the water should be controlled. It is preferred to maintain a moderately low pH, e.g. in the range of from about 4.0 to about 5.0 (say, 4.5), by the use of a suitable food grade acid, such as phosphoric acid or the like. The pH is preferably monitored and adjusted as needed.

Following the desired period of cooking, the cooked barley is separated from the hot cooking water. The water is shown in the FIGURE to be diverted to a drain. The cooked and drained barley is then subjected to an atmosphere of ambient saturated steam for from about 20 to about 35 minutes while spraying hot water (e.g., 200°–210° F.) onto the barley, at least during the initial period of steaming. This stage in processing is carried out to the extent necessary to obtain a drained moisture of from about 70 to about 80% (preferably, from about 73 to about 77%).

The steamed barley is then drained to free it from surface water. The drained barley is then contacted with hot air having a temperature of from about 320° to about 350° F. over a time sufficient to dry the barley to about 12% moisture or less. Typically, the drying will be achieved within a time period of from about 7 to about 15 minutes. Times of from about 9 to about 11 minutes at temperatures of from about 320° to about 350° F. will achieve the preferred moisture contents of from about 7 to about 11%.

Once dried, the barley can be packaged in a suitable packaging material, such as recycled newsprint or clay coated paperboard. For preparation for consumption, the barley is simply heated in boiling water for about 5 minutes (and, if desired, up to about 15 minutes) and then let to stand (preferably, covered) for another 5 minutes. The volume of water used for preparation will typically fall within the range of from about 1 to about 2 times the volume of barley. A typical volume of water is about 1.5 times the volume of barley. In the case that boiling is extended beyond 5 minutes, the standing time can be reduced to achieve the texture desired by the consumer.

It is an advantage of the present invention that the barley can be cooked by hydrating it in at least an equal volume of boiling water followed by a 5 minute stand, to achieve a cooked texture, as measured by a shear press value of from about 70 to about 95 lbs/force, preferably from about 75 to about 90. The product appearance will be similar to long-cooking barley that has been soaked for several hours (e.g., overnight) and cooked in boiling or near-boiling water for a period of at least 40 minutes (typically 40 to 60 minutes). It is also an advantage of the invention that the process does not include any flattening, flaking, or other deformation of the barley.

EXAMPLE

This example is presented for the purpose of further illustrating and explaining the invention, and is not to be taken as limiting in any regard. Unless otherwise indicated, all parts and percentages are based on the weight of the components at the stage of processing indicated.

A quick-cooking barley product is prepared according to the process shown generally in the FIGURE. Significantly, the process does not include any flattening or flaking of the barley.

Hulled, medium- or fine-pearled barley is fed to a continuous rotary cooker at a rate of 1200 lbs/hr. Water is also fed to the cooker at a rate of 5–15 rpm. The water is periodically tested and phosphoric acid is added as necessary to adjust the pH to about 4.5 to maintain the color of the barley during the processing. The water is maintained at a temperature of from about 205° to about 210° F. for the cooking of this stage which takes about 25 minutes and raises the moisture content of the barley to about 60%. The cooked barley is separated from the hot water.

The barley is then passed through a belt type steamer wherein it is contacted with saturated steam at ambient pressure for about 30 minutes while spraying hot water at a temperature of about 205° F. onto the barley. After draining the water, the barley has a moisture content of about 75%. The drained barley is contacted in a continuous belt dryer with sufficient hot air having a temperature of about 340° F., and a relative humidity of less than about 2% for about 10 minutes to obtain a moisture content of about 9%.

The resulting quick-cooking barley product is characterized in that it can be cooked by hydrating in at least an equal volume of boiling water for from about 5 minutes followed by a 5 minute stand, to achieve a cooked texture, as measured by a shear press value of about 90 lbs/force and appearance similar to long-cooking barley, and further characterized in that it has not been flattened, flaked, or otherwise deformed.

The above description is for the purpose of teaching the person of ordinary skill in the art how to practice the present invention, and it is not intended to detail all of those obvious modifications and variations of it which will become apparent to the skilled worker upon reading this description. It is intended, however, that all such obvious modifications and variations be included within the scope of the present invention which is defined by the following claims. The claims cover the indicated components and steps in all arrangements and sequences which are effective to meet the objectives intended for the invention, unless the context specifically indicates the contrary.

I claim:

1. A process for preparing a quick-cooking barley which can be cooked by boiling in at least an equal volume of boiling water followed by a 5 minute stand and which will have a cooked texture, as measured by a shear press value of from about 70 to about 95 lbs/force and appearance similar to long-cooking barley, after said long-cooking barley has been soaked for several hours and cooked in boiling water for a period of at least 40 minutes, wherein the process does not include any flattening or flaking of the barley, said process comprising the steps of:

(a) cooking hulled and medium- or fine-pearled barley in boiling or near-boiling water for a time effective to raise the moisture content of the barley to within the range of from about 55 to about 65%;

(b) separating the cooked barley from the hot water;

(c) subjecting the barley to an atmosphere of ambient, saturated steam for from about 20 to about 35 minutes while spraying hot water onto the barley, at least during the initial period of steaming, in order to obtain a drained moisture of from about 70 to about 80%;

(d) draining the steamed barley from free and surface water; and (e) drying the drained barley with hot air having a temperature of about 320°–350° F. over a time period of about 7–15 minutes to obtain a moisture content of about 12% or less.

2. The process of claim 1 wherein the cook water of step (c) is adjusted to a pH within the range of from about 4 to about 5.

3. The process of claim 2 wherein the pH is adjusted with phosphoric acid.

4. The process of claim 1 wherein the barley is cooked in a continuous, rotary cooker.

5. The process of claim 1 wherein the final barley product has the indicated shear press values after boiling in water for from about 5 to about 15 minutes followed by letting it stand in the water for about another five minutes.

6. The process of claim 5 wherein the shear press value falls within the range of from about 75 to about 90 lbs/force.

7. The process of claim 1 wherein the barley is hydrated by the steaming in step (c) to a drained moisture within the range of from about 73 to about 77%.

8. The process of claim 1 wherein the water utilized for the cooking in step (a) has a temperature of from about 205° to about 210° F.

9. The process of claim 1 wherein the cooking of step (a) is from about 15 to about 40 minutes.

10. A process for preparing a quick-cooking barley which can be cooked by hydrating in at least an equal volume of boiling water for from 5 to 15 minutes followed by a 5 minute stand and which will have a cooked texture, as measured by a shear press value of from about 75 to about 90 lb/force and appearance similar to long-cooking barley, after said long-cooking barley has been soaked for several hours and cooked in boiling water for a period of from about 40 to about 60 minutes, wherein the process does not include any flattening or flaking of the barley, said process comprising the steps of;

(a) cooking hulled and medium or fine pearled barley in a continuous rotary cooker in water, adjusted to a pH of from about 4 to about 5 to maintain the color of the barley and having a temperature of from about 205° to about 210° F., for from about 15 to about 40 minutes in order to raise the moisture content of the barley to from about 55 to about 65%;

(b) separating the cooked barley from the hot water;

(c) subjecting the barley to an atmosphere of ambient, saturated steam for from about 20 to about 35 minutes while spraying hot water at a temperature of from about 200° to about 210° F. onto the barley, at least during the initial period of steaming, in order to obtain a drained moisture of from about 73 to about 77%;

(d) draining the steamed barley from free and surface water; and (e) drying the drained barley with hot air having a temperature of from about 320° to about 350° F. over a time period of from about 7 to about 15 minutes to obtain a moisture content of about 12% or less.

11. The process of claim 10 wherein the pH is adjusted with phosphoric acid.

12. The barley product of claim 11.

13. A quick-cooking barley product characterized in that it can be cooked by hydrating in at least an equal volume of boiling water for from about 5 to about 15 minutes followed by a 5 minute stand to achieve a cooked texture, as measured by a shear press value of from about 70 to about 95 lbs/force and appearance similar to long-cooking barley, and further characterized in that it has not been flattened, flaked, or otherwise deformed.

14. A quick-cooking barley product according to claim 13 having a shear press value within the range of from about 75 to about 90 following boiling in water for 5 minutes and letting stand in the water for another 5 minutes.

* * * * *